United States Patent

Sugiyama et al.

[11] 4,388,115
[45] Jun. 14, 1983

[54] AQUEOUS INK COMPOSITION

[75] Inventors: Masatoshi Sugiyama; Akira Ogawa, both of Minami-ashigara; Shinichi Imai, Odawara, all of Japan

[73] Assignee: Fuji Photo Film Co., Ltd., Kanagawa, Japan

[21] Appl. No.: 274,045

[22] Filed: Jun. 15, 1981

[30] Foreign Application Priority Data

Jun. 13, 1980 [JP] Japan ................................. 55-79925

[51] Int. Cl.$^3$ .............................................. C09D 11/02
[52] U.S. Cl. ...................................... 106/22; 260/163
[58] Field of Search ........................... 106/22; 260/163

[56] References Cited

U.S. PATENT DOCUMENTS 4,210,582 7/1980 de Montmollin et al. .......... 260/163
4,217,272 8/1980 Crounse .............................. 260/163

FOREIGN PATENT DOCUMENTS 1526017 9/1978 United Kingdom .

Primary Examiner—John Kight, III
Assistant Examiner—Amelia B. Yarbrough
Attorney, Agent, or Firm—Sughrue, Mion, Zinn, Macpeak & Seas

[57] ABSTRACT

An aqueous ink composition having a water-soluble dye and a wetting agent dissolved in water is disclosed. The composition uses at least one water-soluble dye of the formula (I):

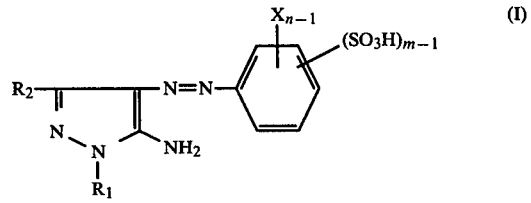

wherein $R_1$ is a phenyl group, a substituted phenyl group, an alkyl group or a substituted alkyl group; $R_2$ is an alkyl group, a phenyl group, a substituted phenyl group, a cyano group, a hydroxyl group, an alkoxy group, an amino group, an acylamino group, an anilino group, a ureido group, an alkoxycarbonyl group or a carbamoyl group; X is a halogen atom, an alkyl group or an alkoxy group; n is 1, 2, 3, 4 or 5; and m is 1, 2, or 3, provided that the sulfo group in the formula (I) may be an alkali metal salt, an ammonium salt or an organic amine salt.

9 Claims, No Drawings 4,388,115

AQUEOUS INK COMPOSITION

FIELD OF THE INVENTION

This invention relates to an aqueous ink composition advantageous for printing, writing, recording and stamping purposes, and more particularly, to an improved aqueous ink composition that provides a clear image that is highly light-fast and which does not spread on a recording medium. The invention also relates to an improved aqueous yellow ink composition that achieves faithful color reproduction in the color image produced by combination with yellow and cyan ink compositions. The invention further relates to an aqueous ink composition for ink-jet printing that can be consistently discharged without clogging the small nozzle of an ink-jet printer and which does not form a solid deposit on the inner wall of the nozzle throughout extended continuous operation or when the operation is resumed after a short or long suspension.

BACKGROUND OF THE INVENTION

There are three typical systems for ink-jet printing. In one system ink droplets are ejected through a small nozzle normally from several microns to several hundreds microns in diameter, and each droplet is imparted a predetermined static charge by electrical signals, then deflected electrostatically between high-voltage deflection plates to form a character or figure on a recording medium according to a predetermined dot matrix. In a second system ink droplets are drawn through a small nozzle of the above specified size under the electrostatic control of high-voltage plates, accelerated, and then electrostatically deflected between deflection plates to form a letter or figure on a recording medium according to a predetermined dot matrix. In the third system, ink droplets are ejected in response to electrical signals to form a letter, figure or a picture on a recording medium according to a predetermined dot matrix.

Therefore, the basic concept of ink-jet printing is to form a letter or figure on a recording medium by ink droplets ejected through a small nozzle, charged electrically and controlled electrostatically, or by ink droplets discharged from the nozzle in response to electrical signals.

Aqueous ink for use in ink-jet printing comprises water (as a vehicle), a hydrophilic organic solvent, a coloring dye and other optional additives. With such ink, a letter, figure or picture can be printed on various objects such as plastics, metals, paper or cloth. Having these applications, aqueous ink for ink-jet printing must meet the following requirements.

(1) Requirements for providing uniform ink droplets through a small nozzle:
 (a) the ink has a viscosity of from 1 to 10 cPs at 20° C.;
 (b) the ink has a surface tension of more than 20 dynes/cm; and
 (c) the ink comprises uniformly sized particles.

(2) Requirements for providing a good image on a recording medium:
 (a) the ink droplets applied onto the recording medium dry quickly enough to form a letter, figure or picture that does not lose shape;
 (b) the ink is sufficiently waterproof to provide a letter, figure or picture on the recording medium that does not dissolve in water; and
 (c) the ink has good tack to the recording medium.

(3) Requirements for providing a good color image on a recording medium:
 (a) the ink contains dyes that provide colors identical with those required in the final color images;
 (b) for color production by the subtractive process, the ink preferably contains yellow, magenta and cyan inks which absorb only light in the desired spectral ranges and desirably do not absorb light in other ranges;
 (c) the ink provides a color image which is satisfactorily sharp and does not spread on the recording medium;
 (d) the ink contains dyes that provide high chroma and color density, and its hue and light-fastness do not change during ink storage or after it is applied onto the recording medium to form an image;
 (e) the ink contains dyes that have a water solubility high enough to provide an ink composition of high chroma and color density;
 (f) the ink contains dyes that do not make the ink extremely viscous; and
 (g) the ink contains dyes that have low crystallizability and which do not crystallize or solidify during storage to form a deposit that clogs the nozzle.

The water-soluble dyes conventionally used in ink for ink-jet printing are direct and acid dyes of the type described in Japanese Patent Application (OPI) No. 89534/74 (the symbol "OPI" as used herein means an unexamined published Japanese patent application), Japanese Patent Publication Nos. 16243/79, 16244/79, 16245/79, Japanese Patent Application (OPI) Nos. 96105/77, 146307/77, 77706/78, Japanese Patent Publication No. 21765/79 and Japanese Patent Application (OPI) No. 89811/79. However, ink using these dyes is not completely satisfactory because it sometimes clogs the nozzle during continuous operation or when the operation is restarted after a short or long suspension, or it provides an image that spreads on the recording medium or which is not highly light-fast. As a further disadvantage, the combination of yellow, magenta and cyan ink compositions incorporating these dyes does not always provide a color image having faithful color reproduction.

SUMMARY OF THE INVENTION

Therefore, one object of this invention is to provide an aqueous yellow ink composition suitable for printing, writing, recording and stamping purposes.

Another object of this invention is to provide an aqueous yellow ink composition that achieves a satisfactory degree of chroma and color density and which changes little upon storage.

A further object of this invention is to provide an improved aqueous yellow ink composition for ink-jet printing that does not clog the nozzle of an ink-jet printer.

A still further object of this invention is to provide an improved aqueous yellow ink composition for ink-jet printing that forms a satisfactorily shape image that does not spread on a recording medium.

These objects of this invention can be achieved by using at least one water-soluble dye represented by the following formula (I):

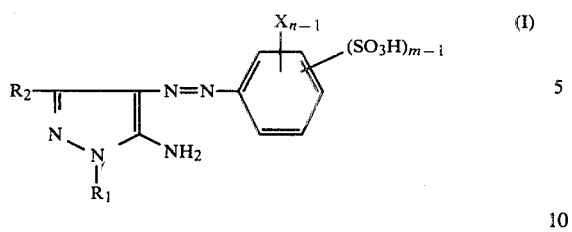

wherein R₁ is a phenyl group, a substituted phenyl group (the substituent being Cl, an alkyl group, alkoxy group, sulfo group or carboxyl group), an alkyl group or a substituted alkyl group (the substituent being a sulfo group or cyanoethyl group); R₂ is an alkyl group, a phenyl group, a substituted phenyl group (the substituent being Cl, alkyl group or alkoxy group), a cyano group, a hydroxyl group, an alkoxy group, an amino group, an acylamino group, an anilino group, a ureido group, an alkoxycarbonyl group or a carbamoyl group; X is a halogen atom, an alkyl group or an alkoxy group; n is 1, 2, 3, 4 or 5; m is 1, 2 or 3; sulfo groups in the formula (I) may be an alkali metal salt (e.g., sodium salt or potassium salt), an ammonium salt or an organic amine salt (e.g., triethylamine salt, pyridine salt or triethanolamine salt); when m is 1, R₁ is desirably a sulfo-substituted alkyl group or phenyl group.

Preferred examples of the water-soluble dye represented by the formula (I) are those wherein R₁ is a phenyl group, a substituted phenyl group, an alkyl group or a substituted alkyl group; R₂ is an alkyl group or a phenyl group; X is a halogen atom; n is 1, 2, 3 or 4; and m is 1, 2 or 3.

More preferred examples of the water-soluble dye represented by the formula (I) are those wherein R₁ is a phenyl group, a substituted phenyl group, a (C₁–C₄)alkyl group or a sulfo-(C₁–C₄)alkyl group; R₂ is a phenyl group or a (C₁–C₃)alkyl group; X is a chlorine atom; n is 2 or 3; and m is 1, 2 or 3.

A particularly preferred water-soluble dye for use in the ink composition of this invention is represented by the following formula (II):

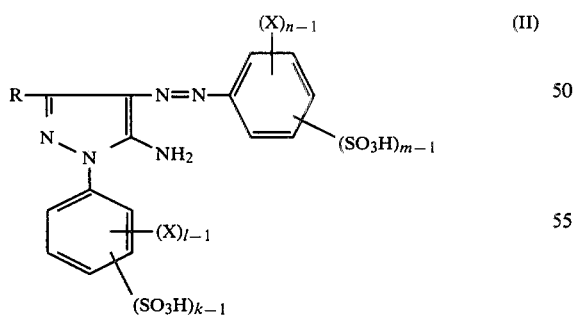

wherein R is a (C₁–C₃)alkyl group such as a methyl, ethyl or propyl group; X is a chlorine atom; (k+m) is 3 or 4; and (n+l) is 3, 4, 5 or 6.

Some examples of the water-soluble dye to be incorporated in the ink composition according to this invention are given below, but it should be understood that the dyes that can be used in this invention are by no means limited to these examples.

Dye Examples

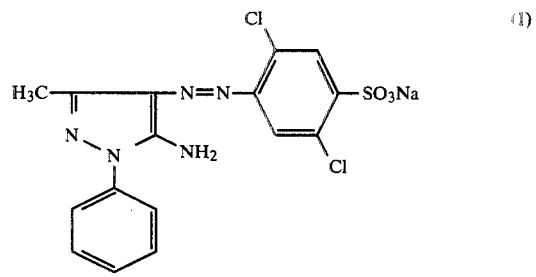
(1)

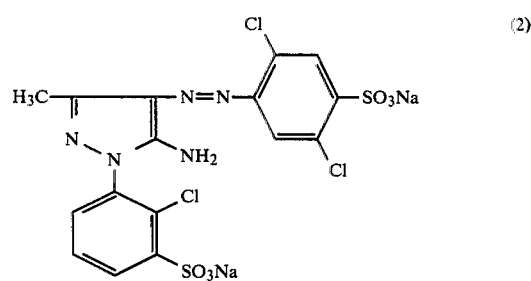
(2)

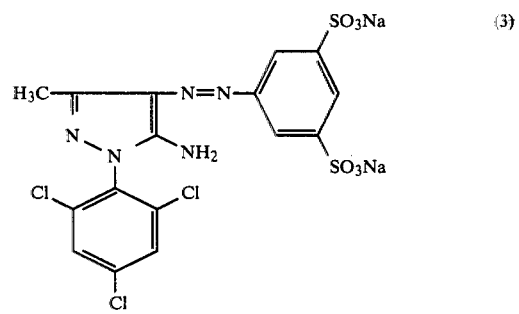
(3)

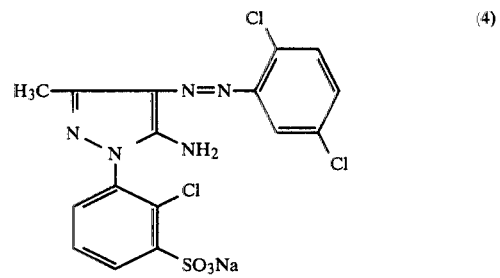
(4)

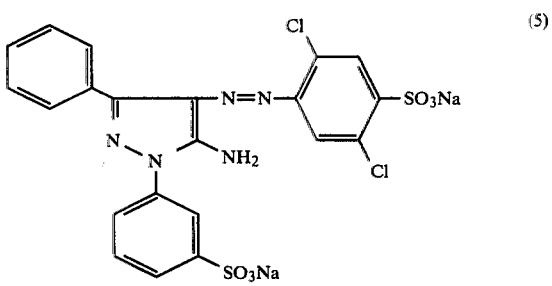
(5)

-continued
Dye Examples

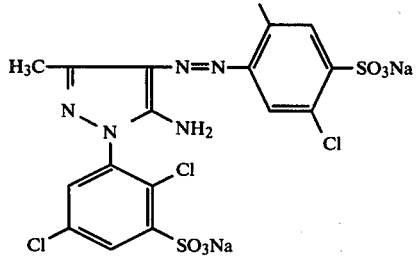 (6)

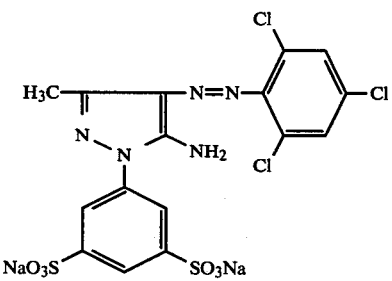 (7)

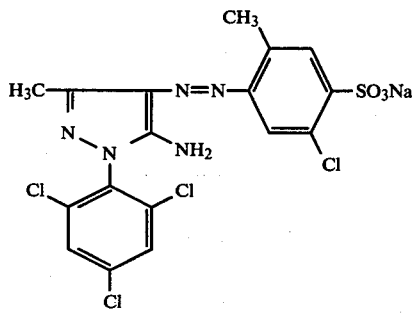 (8)

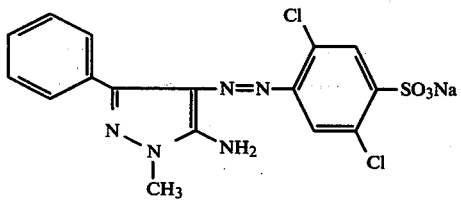 (9)

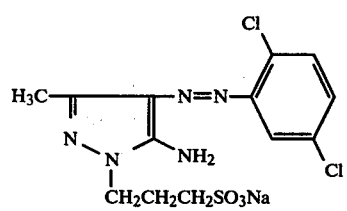 (10)

The yellow dye to be incorporated in the ink composition of this invention can be synthesized by a known method. For instance, the dye of the formula (II) is readily synthesized by diazotizing

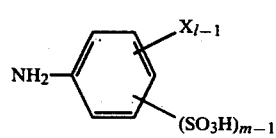

(X, l and m defined above) and reacting the diazonium salt with

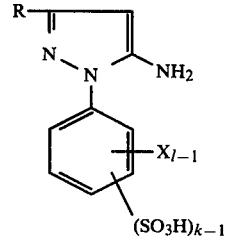

(X, l and k defined above).

The water-soluble dye is incorporated in the ink composition of this invention generally in an amount of 0.5 to 6 wt% based on 100 parts by weight of the ink composition. If the dye is used in an amount of less than 0.5 part by weight, it does not work as a colorant satisfactorily, and if it is used in an amount of more than 6 parts by weight, it comes out of solution as time goes by and forms a precipitate that clogs the nozzle.

The yellow ink of this invention can be combined with magenta and cyan inks to form a color image by the subtractive process, and the following dyes can be incorporated in the magenta and cyan inks. Examples of the water-soluble dye for incorporation in magenta ink include dyes of the type described in Japanese Patent Application (OPI) Nos. 89811/79, 8630/79 and 89534/74, as well as direct and acid dyes such as C.I. Direct Red-63, -75, -79, -80, -83, -99, -220, -224, -225, and C.I. Acid Red-1, -8, -32, -37, -42, -52, -57, -87, -92, -115, -119, -131, -133, -134, -154, -186, -249, -254 and -256. Examples of the water-soluble dye for incorporation in cyan ink include dyes of the type described in Japanese patent application (OPI) Nos. 89811/79 and 12008/77, as well as direct and acid dyes such as C.I. Direct Blue-1, -8, -71, -76, -78, -80, -86, -90, -106, -108, -123, -163, -165, C.I. Acid Blue-29, -126, -171, -175 and -183.

The ink composition according to this invention may optionally be combined with a black dye. Examples of the black dyes for use in black ink are direct and acid dyes of the type described in Japanese Patent Application (OPI) Nos. 15622/75, 17840/75, 49004/75, 5127/76, 5128/76, 52004/76, 137506/76, 61412/78, 77706/78 and Japanese Patent Publication No. 16243/79.

A wetting agent is incorporated in the ink composition of this invention. The wetting agent improves the resistance of the ink composition to dryness and aids the dissolution of the dye. A preferred wetting agent is substantially nonvolatile at room temperature. The wetting agent in an amount of 3 to 40 wt% aqueous solution has a surface tension of at least 30 dynes/cm, particularly of at least 45 dynes/cm and a viscosity of less than 50 cPs at room temperature (e.g., about 20°–30° C.) and has at least 1 wt% of the aforementioned water-soluble dye dissolved therein at room temperature. Preferred examples of the wetting agent are listed below: 2-pyrrolidones of the type described in Japanese Patent Application (OPI) Nos. 71423/75, 5127/76 and 137505/76; carboxylic acid amide derivatives of the type described in Japanese Patent Application (OPI) Nos. 97620/74, 8031/76 and 8033/76; dioxyethylene sulfur compounds of the type described in Japanese Patent Application (OPI) No. 5129/76; alcohol amines of the type described in Japanese Patent Application (OPI) No. 52004/76; N-formyl-lactam derivatives of the type described in Japanese Patent Application (OPI) No. 31525/76; polyalkylene glycols and monoesters thereof of the type described in Japanese Patent Publication No. 40484/76, Japanese Patent Application (OPI) Nos. 137506/76 and 12909/79; monovalent alcohols such as t-butyl alcohol and n-amyl alcohol of the type described in Japanese Patent Application (OPI) No. 129310/76; cellulose derivatives (e.g., hydroxypropyl cellulose) and polyvinyl alcohol of the type described in Japanese Patent Application (OPI) No. 17840/75; polyoxyethylene sorbitan aliphatic acid ester, polyoxyethylene aliphatic acid ester and polyoxyethylene alkylphenyl ether of the type described in Japanese Patent Application (OPI) No. 143602/75; water-soluble alginates of the type described in Japanese Patent Application (OPI) No. 62005/79; and 1,3-dialkyl-2-imidazolidinones such as N,N'-dimethyl-1,3-imidazolidinone-(2). The amount of the wetting agent used in this invention varies with the type of the agent, and it is preferably within the range of from 0.2 to 30 wt% based on 100 parts by weight of the ink composition. The wetting agents illustrated above may be used alone or in combination.

Particularly preferred examples of the wetting agent for use in the ink composition of this invention are 2-pyrrolidones such as N-methyl-2-pyrrolidone, N-(2-hydroxy)ethyl-2-pyrrolidone; 1,3-dialkyl-2-imidazolidinones; carboxylic acid amide derivatives such as N-(2-hydroxy)ethyl-lactamide; dioxyethylene sulfur compounds such as 2,2'-thiodiethanol. These substances are preferably used in an amount of 5 to 30 wt% based on 100 parts by weight of the ink composition. In a particularly preferred embodiment, these substances are used together with 0.1 to 1 wt% polyalkylene glycol or monoesters thereof, such as diethylene glycol, triethylene glycol, diethylene glycol monoethyl ether, diethylene glycol monobutyl ether and triethylene glycol monobutyl ether.

The ink composition of this invention may also contain a mold inhibitor and an oxygen absorber. Examples of the effective mold inhibitor include sodium dehydroacetate of the type described in Japanese Patent Application (OPI) No. 12008/77; 1,2-benzisothiazolin-3-one of the type described in Japanese Patent Application (OPI) No. 12009/77; 6-acetoxy-2,4-dimethyl-m-dioxane of the type described in Japanese Patent Application (OPI) Nos. 12010/77 and 96105/77; formalin and pentachlorophenol sodium of the type described in Japanese Patent Application (OPI) No. 15622/75; sodium benzoate of the type described in Japanese Patent Application (OPI) No. 30019/76; and citric acid salt of 8-quinolinol of the type described in Japanese Patent Application (OPI) No. 135707/78. Examples of the effective oxygen absorber are sulfites such as sodium sulfite and sodium hydrogensulfite of the type described in Japanese Patent Application (OPI) Nos. 74406/77 and 61412/78.

The ink composition of this invention may further contain a surface tension modifier. Examples of the surface tension modifier include an anionic surfactant (e.g., sodium salt of alkylsulfate ester), a cationic surfactant (e.g., alkylpyridinium sulfate salt), a nonionic surfactant (e.g., polyoxyethylene alkyl ether) and an amphoteric surfactant.

This invention is now described in greater detail by reference to the following examples which are given here for illustrative purposes only and are by no means intended to limit the scope of the invention. In the examples, all parts are by weight.

EXAMPLE 1

A blend of the formulation indicated below was heated at 40° to 50° C. under stirring for 1 hour, and the resulting mixture was passed through a micro-filter of FM type (the product of Fuji Photo Film Co., Ltd., thickness = $0.8\mu$, pore size = $47\mu$) at 3 kg/cm$^2$ to prepare a yellow ink composition.

|  | parts |
|---|---|
| Dye Example 1 | 2.8 |
| Diethylene glycol | 1.0 |
| 2,2'-Thiodiethanol | 16.0 |
| Noigen p (a nonionic surfactant produced by Dai-Ichi-Kogyo Seiyaku Co., Ltd.) | 0.2 |
| Water | 80.0 |

EXAMPLE 2

A yellow ink composition was prepared from a blend of the following formulation by repeating the procedure of Example 1.

|  | parts |
|---|---|
| Dye Example 1 | 2.8 |
| N—Methyl-2-pyrrolidone | 15.0 |
| Diethylene glycol monoethyl ether | 1.0 |
| Noigen p | 0.2 |
| Water | 79.0 |

EXAMPLE 3

A yellow ink composition was prepared from a blend of the following formulation by repeating the procedure of Example 1.

|  | parts |
|---|---|
| Dye Example 1 | 2.8 |
| N—(2-Hydroxy)ethyl-2-pyrrolidone | 6.0 |
| 2,2'-Thiodiglycol | 10.0 |
| Triethylene glycol monomethyl ether | 1.0 |
| Noigen p | 0.2 |
| Water | 80.0 |

EXAMPLE 4

A yellow ink composition was prepared from a blend of the following formulation by repeating the procedure of Example 1.

|  | parts |
|---|---|
| Dye Example 2 | 2.9 |
| 2,2'-Thiodiethanol | 16.0 |
| Diethylene glycol monobutyl ether | 0.1 |
| Noigen p | 0.1 |
| Sodium dehydroacetate (mold inhibitor) | 0.1 |
| Water | 80.8 |

EXAMPLE 5

A yellow ink composition was prepared from a blend of the following formulation by repeating the procedure of Example 1.

|  | parts |
| --- | --- |
| Dye Example 3 | 2.9 |
| 1,3-Dimethyl-2-imidazolidinone | 18.0 |
| 2,2'-Thiodiethanol | 3.0 |
| Triethylene glycol monomethyl ether | 0.5 |
| Noigen p | 0.2 |
| Sodium dehydroacetate (mold inhibitor) | 0.1 |
| Water | 75.3 |

Comparative ink compositions were prepared by using the known dyes indicated below.

Comparative Dye 1: Described in Japanese Patent Application (OPI) No. 89811/79

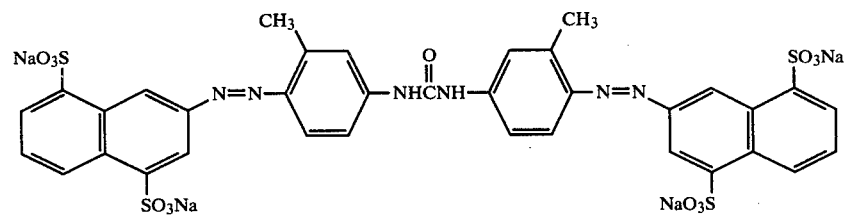

Comparative Dye 2: Described in Japanese Patent Application (OPI) No. 145638/76

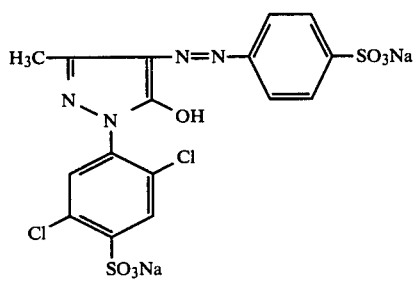

Comparative Dye 3: Described in Japanese Patent Application (OPI) No. 146307/77

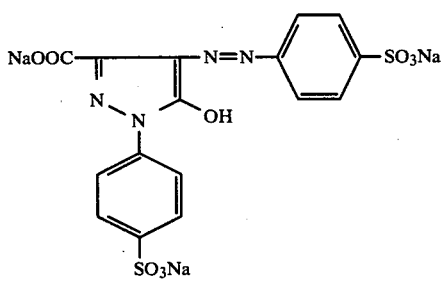

Comparative Dye 4: Described in Japanese Patent Publication No. 16245/79

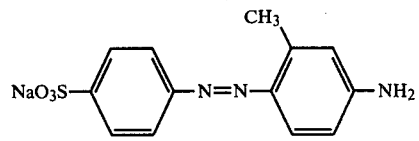

COMPARATIVE EXAMPLE 1

A comparative ink composition was prepared by repeating the procedure of Example 2 except that 2.8 parts of Dye Example 1 was replaced by 1.2 parts of Comparative Dye 1.

COMPARATIVE EXAMPLE 2

A comparative ink composition was prepared by repeating the procedure of Example 1 except that 2.8 parts of Dye Example 1 was replaced by 2.5 parts of Comparative Dye 2.

COMPARATIVE EXAMPLE 3

A comparative ink composition was prepared by repeating the procedure of Example 1 except that 2.8 parts of Dye Example 1 was replaced by 2.4 parts of Comparative Dye 3.

COMPARATIVE EXAMPLE 4

A comparative ink composition was prepared by repeating the procedure of Example 1 except that 2.8 parts of Dye Example 1 was replaced by 2.0 parts of Comparative Dye 4.

Table 1 below shows the physical properties and performance of the ink compositions prepared in Examples 1 to 5 and Comparative Examples 1 to 4, as well as the quality of the image formed of those ink compositions on fine paper by an ink-jet printer ("Jet Print" of Sharp Corporation).

TABLE 1

| Example and Comparative Example No. | Viscosity cps (25° C.) | Surface Tension dyne/cm (25° C.) | Storage Stability of Ink (1 month at 5° C.) | Nozzle Clogging[1] | Light-Fastness (% residual dye) upon Exposure to Xenon Lamp (20,000 lux for 5 days) | Hue |
| --- | --- | --- | --- | --- | --- | --- |
| Example 1 | 2.06 | 44.6 | Good | 10 Days or more | 98.0% | Sharp yellow |
| Example 2 | 2.11 | 45.0 | " | 10 Days or more | 97.2% | " |
| Example 3 | 2.20 | 46.0 | " | 10 Days or more | 98.4% | " |
| Example 4 | 2.06 | 45.8 | " | 10 Days or more | 97.4% | " |
| Example 5 | 2.13 | 43.0 | " | 10 Days or more | 94.2% | " |
| Comparative Example 1 | 2.46 | 41.0 | Dye precipitated | 1 Day | 65.0% | Orange-tinted yellow |

TABLE 1-continued

| Example and Comparative Example No. | Viscosity cps (25° C.) | Surface Tension dyne/cm (25° C.) | Storage Stability of Ink (1 month at 5° C.) | Nozzle Clogging[1] | Light-Fastness (% residual dye) upon Exposure to Xenon Lamp (20,000 lux for 5 days) | Hue |
| --- | --- | --- | --- | --- | --- | --- |
| Comparative Example 2 | 2.21 | 42.2 | Dye precipitated | 5 Days | 70.5% | Yellow |
| Comparative Example 3 | 2.16 | 43.0 | Good | 10 Days or more | 24.0% | Orange |
| Comparative Example 4 | 2.01 | 41.6 | Good | 10 Days or more | 15.0% | Pale yellow |

[1]The period of suspension required for the ink to clog the nozzle of the ink-jet printer.

As is clear from the table, the ink compositions incorporating the water-soluble dye specified herein had high storage stability and did not clog the nozzle of the ink-jet printer. The image formed of those ink compositions did not spread on the recording paper and had a high light-fastness characteristic. The ink compositions presented a sharp magenta hue and when combined with yellow and cyan ink compositions, they provided an image having faithful color reproduction without the adverse effect of the other ink compositions.

While the invention has been described in detail and with reference to specific embodiments thereof, it will be apparent to one skilled in the art that various changes and modifications can be made therein without departing from the spirit and scope thereof.

What is claimed is:

1. An aqueous yellow ink composition comprising: a water-soluble dye and a wetting agent dissolved in water, wherein said water-soluble dye has the formula (I):

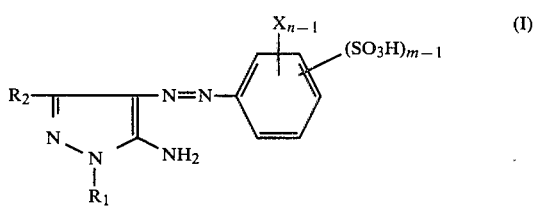

wherein $R_1$ is a phenyl group, a substituted phenyl group, an alkyl group or a substituted alkyl group; $R_2$ is an alkyl group, a phenyl group, a substituted phenyl group, a cyano group, a hydroxyl group, an alkoxy group, an amino group, an acylamino group, an anilino group, a ureido group, an alkoxycarbonyl group or a carbamoyl group; X is a halogen atom, an alkyl group or an alkoxy group; n is 1, 2, 3, 4 or 5; and m is 1, 2 or 3, provided that the sulfo group in the formula (I) may be an alkali metal salt, an ammonium salt or an organic amine salt.

2. An aqueous ink composition as in claim 1, wherein $R_1$ is a phenyl group, a substituted phenyl group, an alkyl group or a substituted alkyl group; $R_2$ is an alkyl group or a phenyl group; X is a halogen atom; n is 1, 2, 3 or 4; and m is 1, 2 or 3.

3. An aqueous ink composition as in claim 1, wherein $R_1$ is a phenyl group, a substituted phenyl group, a $(C_1-C_4)$alkyl group or a sulfo-$(C_1-C_4)$alkyl group; $R_2$ is a phenyl group or a $(C_1-C_3)$alkyl group; X is a chlorine atom; n is 2 or 3; and m is 1, 2 or 3.

4. An aqueous ink composition as in claim 1, wherein said water-soluble dye has the formula (II):

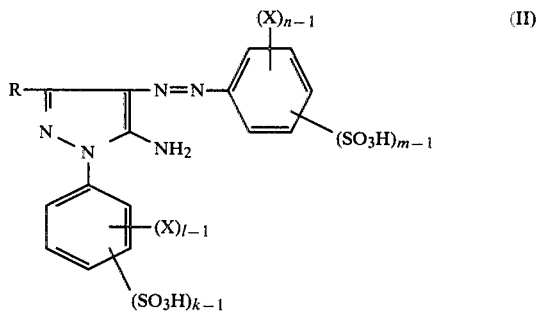

wherein R is a $(C_1-C_3)$alkyl group; X is a chlorine atom; (k+m) is 3 or 4; and (n+l) is 3, 4, 5 or 6.

5. An aqueous ink composition as in claim 1, wherein said wetting agent has a surface tension of at least 30 dynes/cm and a viscosity of less than 50 cPs at room temperature in a 3 to 40 wt% aqueous solution thereof.

6. An aqueous ink composition as in claim 1, wherein said wetting agent is at least one selected from the group consisting of a 2-pyrrolidone, a carboxylic acid amide derivative, a dioxyethylene sulfur compound, an alcohol amine, an N-formyl-lactam derivative, a polyalkylene glycol or a monoester thereof, a monovalent alcohol, a cellulose derivative, a polyvinyl alcohol, a polyoxyethylene sorbitan aliphatic acid ester, a polyoxyethylene aliphatic acid ester, a polyoxyethylene alkylphenyl ether, a water-soluble alginate and a 1,3-dialkyl-2-imidazolidinone.

7. An aqueous ink composition as in claim 1, wherein said wetting agent is at least one selected from the group consisting of a 2-pyrrolidone, a 1,3-dialkyl-2-imidazolidinone and a dioxyethylene sulfur compound.

8. An aqueous ink composition as in claim 1, wherein said wetting agent is a combination of one selected from a 2-pyrrolidone, a 1,3-dialkyl-2-imidazolidinone and a dioxyethylene sulfur compound, with a polyalkylene glycol or a monoester thereof.

9. An aqueous ink composition as in claim 1, which is useful for ink-jet printing.

* * * * *